US011996004B2

(12) United States Patent
Schoensee et al.

(10) Patent No.: US 11,996,004 B2
(45) Date of Patent: May 28, 2024

(54) FLIGHT SCHOOL CREDENTIALING AND VERIFICATION SYSTEM

(71) Applicant: Paragon Flight Training Co., Fort Myers, FL (US)

(72) Inventors: Christopher Schoensee, Fort Myers, FL (US); Jeffery M. Wolf, Fort Myers, FL (US); Carlos Rene Serrato, Cape Coral, FL (US)

(73) Assignee: Paragon Flight Training Co., Fort Myers, FL (US)

( * ) Notice: Subject to any disclaimer, the term of this patent is extended or adjusted under 35 U.S.C. 154(b) by 637 days.

(21) Appl. No.: 17/092,807

(22) Filed: Nov. 9, 2020

(65) Prior Publication Data

US 2022/0148455 A1   May 12, 2022

(51) Int. Cl.
  *G09B 19/16* (2006.01)
  *G06Q 50/20* (2012.01)
  *G06Q 50/26* (2012.01)

(52) U.S. Cl.
  CPC ....... *G09B 19/165* (2013.01); *G06Q 50/2053* (2013.01); *G06Q 50/265* (2013.01)

(58) Field of Classification Search
  CPC .............. G09B 19/165; G06W 50/265; G06W 50/2053
  See application file for complete search history.

(56) References Cited

U.S. PATENT DOCUMENTS

| | | | | |
|---|---|---|---|---|
| 2014/0134578 | A1* | 5/2014 | Clark | G09B 5/06 434/219 |
| 2015/0066250 | A1* | 3/2015 | Garzella | B64D 43/00 701/3 |
| 2021/0390879 | A1* | 12/2021 | Sivaratri | G09B 19/165 |

* cited by examiner

*Primary Examiner* — Robert J Utama
(74) *Attorney, Agent, or Firm* — Young Basile Hanlon & MacFarlane, P.C.

(57) ABSTRACT

A flight school credentialing and verification system uses software tools to implement flight school functionality, including scheduling flight course sessions, customizing flight course sessions, and integrating third party tools, all in accordance with safety requirements as established by a regulatory body. For example, a flight school credentialing and verification software application may determine whether credential items of a user satisfy credential definitions defined for a flight course. Responsive to a determination that the credential items satisfy the credential definitions, an availability of one or more resources of a flight school used for the flight course can be verified, and, responsive to that verification, one or more candidate flight course registrations are determined. A flight course output indicative of a selected flight course registration is then generated. To maintain and automate safety, the credential definitions can be updated based on changes to flight course requirements made by the regulatory body.

20 Claims, 10 Drawing Sheets

FLIGHT SCHOOL CREDENTIALING AND VERIFICATION SYSTEM

BACKGROUND

Flight school enrolls students seeking to acquire the ability to fly an airplane. A flight school may offer many different flight courses, in which each flight course may be directed to a different type of flying experience and, upon completion, result in a particular certification. Safety requirements and other credentialing is heavily controlled by relevant agencies, including the Federal Aviation Administration (FAA) and Transportation Security Administration (TSA).

SUMMARY

Disclosed herein are, inter alia, implementations of flight school credentialing and verification systems and techniques performed by same.

In one implementation, a flight school credentialing and verification system includes a storage device, a memory, and a processor. The storage device includes a data store storing resource information indicative of resources of a flight school and credential definitions indicative of flight course requirements defined by a regulatory body. The memory stores instructions for a flight school credentialing and verification software application. The processor executes the instructions stored in the memory. The instructions include instructions to: receive user information indicative of credential items of a user of the flight school credentialing and verification software application and course information indicative of a flight course for which the user seeks registration; determine whether the credential items of the user related to the flight course satisfy one of more of the credential definitions, wherein the one or more credential definitions are defined for the flight course; responsive to a determination that the credential items satisfy the one or more credential definitions, verify an availability of one or more of the resources using the resource information, wherein the one or more resources are used for the flight course; responsive to a verification of the availability of the resources, determine one or more candidate flight course registrations, wherein each of the candidate flight course registrations corresponds to a different date or time; generate flight course output indicative of a selected flight course registration of the one or more candidate flight course registrations; identify, at a time after the flight course output is generated, changes made by the regulatory body to at least some of the flight course requirements; update at least some of the credential definitions according to the changes made by the regulatory body to the at least some flight course requirements; determine whether the at least some credential definitions updated according to the changes made by the regulatory body to the at least some flight course requirements are satisfied by credential items of the user; responsive to a determination that the at least some credential definitions updated according to the changes made by the regulatory body to the at least some flight course requirements are satisfied by the credential items of the user, maintain the flight course registration; and responsive to a determination that the at least some credential definitions updated according to the changes to the at least some flight course requirements are not satisfied by the credential items of the user, revoke the flight course registration and transmit a notification to a client device of the user to indicate the revocation of the flight course registration.

In another implementation, a flight school credentialing and verification system includes a storage device, a memory, and a processor. The storage device includes a data store storing resource information indicative of resources of a flight school and credential definitions indicative of flight course requirements defined by a regulatory body. The memory stores instructions for a flight school credentialing and verification software application. The processor executes the instructions stored in the memory. The instructions include instructions to: receive user information indicative of credential items of a user of the flight school credentialing and verification software application and course information indicative of a flight course for which the user seeks registration; determine whether the credential items of the user related to the flight course satisfy one of more of the credential definitions, wherein the one or more credential definitions are defined for the flight course; responsive to a determination that the credential items satisfy the one or more credential definitions, verify an availability of one or more of the resources using the resource information, wherein the one or more resources are used for the flight course; responsive to a verification of the availability of the resources, determine one or more candidate flight course registrations, wherein each of the candidate flight course registrations corresponds to a different date or time; and generate flight course output indicative of a selected flight course registration of the one or more candidate flight course registrations.

In yet another implementation, a flight school credentialing and verification system includes a memory and a processor. The memory stores instructions for a flight school credentialing and verification software application. The processor executes the instructions stored in the memory. The instructions include instructions to: determine whether credential items of a user of the flight school credentialing and verification software application satisfy one of more of the credential definitions defined for a flight course; responsive to a determination that the credential items satisfy the one or more credential definitions, verify an availability of one or more resources of a flight school used for the flight course; responsive to a verification of the availability of the resources, determine one or more candidate flight course registrations; and generate flight course output indicative of a selected flight course registration of the one or more candidate flight course registrations.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
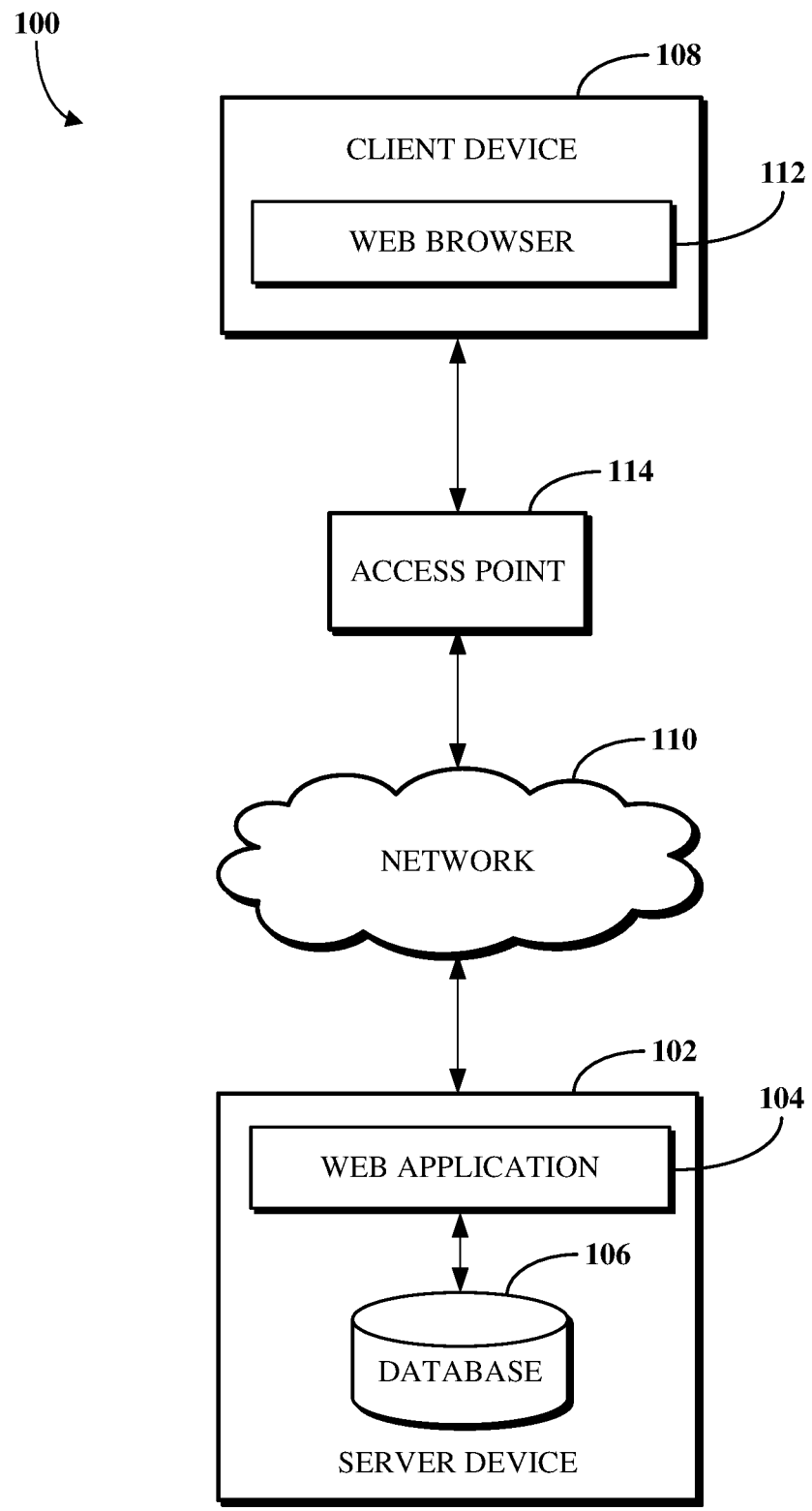
FIG. 1 is a block diagram showing an example of a flight school credentialing and verification system.

A flight school may offer many different flight courses each directed to different types of flying licensure or ability, and, in some cases, based on the specific background and skills of its prospective students. The flight courses may be led by different trainers having various instructor certifications, involve the use of different types of aircraft and/or other equipment, and be arranged at different dates and times. It is thus well understood that the large amount of variability in flight course type and student need makes scheduling a difficult task for flight schools. Conventional flight schools may use software to aide in flight course scheduling, such as to keep track of which students and trainers are registered at which dates and times and/or to keep track of which aircraft and other equipment are in-use at such dates and times. However, conventional flight school software lacks the sophistication required to automate flight course scheduling. Such conventional flight school software further lacks the technical ability to intelligently create flight courses customized to the specific needs of a flight school student, such as with regard to a goal or skillset of the student.

Furthermore, a flight school operator may not be fully aware of certain safety requirements set in place, or changes made thereto, by regulatory bodies (e.g., the FAA or TSA) for allowing certain individuals to fly an aircraft. Conventional flight school software does not keep track of these safety requirements, and such software further does not include an interface with computing aspects of regulatory bodies to receive or retrieve information indicating new safety requirements or changes to existing safety requirements. The failure of conventional flight school software to monitor for and implement changes based on such new and changed information may ultimately result in severe consequences, for example, if a flight school were to knowingly or even unwittingly allow someone who does not possess requisite certification to fly an aircraft. In a best case scenario, an uncertified person allowed to fly despite such conventional failures may successfully fly the aircraft to safe completion; however, in a worst case scenario, severe injury or property damage, or even loss of life, could occur. This failure represents a significant technical problem in the flight school industry.

Implementations of this disclosure address problems such as these using a flight school credentialing and verification system that uses software tools to implement flight school functionality, including scheduling flight course sessions, customizing flight course sessions, and integrating third party software (e.g., interfaces, applications, tools, or the like), all in accordance with safety requirements as established by a regulatory body. For example, a flight school credentialing and verification software application may determine whether credential items of a user satisfy credential definitions defined for a flight course. Responsive to a determination that the credential items satisfy the credential definitions, an availability of one or more resources of a flight school used for the flight course can be verified, and, responsive to that verification, one or more candidate flight course registrations are determined. A flight course output indicative of a selected flight course registration is then generated. To maintain and automate safety, the credential definitions can be updated based on changes to flight course requirements made by the regulatory body.

To describe some implementations in greater detail, reference is first made to examples of hardware and software structures used to implement a flight school credentialing and verification system. FIG. 1 is a block diagram showing an example of a flight school credentialing and verification system 100. The flight school credentialing and verification system 100 includes a server device 102 which runs a web application 104.

The server device 102 may be or include a hardware server (e.g., a server device), a software server (e.g., a web server and/or a virtual server), or both. For example, where the server device 102 is or includes a hardware server, the server device 102 may be a server device located in a rack, such as of a data center. The web application 104 is a software application used by or for a flight school. For example, the web application 104 may be a flight school credentialing and verification software application.

The web application 104 accesses a database 106 on the server device 102 or another server to perform at least some of the functionality of the web application 104. The database 106 is a database or other data store used to store, manage, or otherwise provide data used to deliver functionality of the web application 104. For example, the database 106 may be a relational database management system, an object database, an XML database, a configuration management database, a management information base, one or more flat files, other suitable non-transient storage mechanisms, or a combination thereof.

A client device 108 may be given access to the web application 104. For example, the client device 108 be a mobile device, such as a smart phone, tablet, laptop, or the like. In another example, the client device 108 may be a desktop computer or another non-mobile computer. The client device 108 may use a web browser 112 or other software application (e.g., client-side application software) to communicate with the web application 104. For example, the web browser 112 or other software application enable access to some or all functionality and/or data of the web application 104.

The client device 108 communicates with the server device 102 over a network 110. The network 110 may, for example, be a local area network, a wide area network, a machine-to-machine network, a virtual private network, or another public or private network. The client device 108 may access the network 110 using one or more network protocols, Ethernet, TCP, IP, power line communication, Wi-Fi, Bluetooth®, infrared, GPRS, GSM, CDMA, Z-Wave, ZigBee, another protocol, or a combination thereof. The client device 108 may access the network 110 via an access point 114 intermediary to the client device 108 and the network 110. The access point 114 may be or include network hardware, such as a router, a switch, a load balancer, another network device, or a combination thereof. In some implementations, the access point 114 may be omitted.

Figure 2:
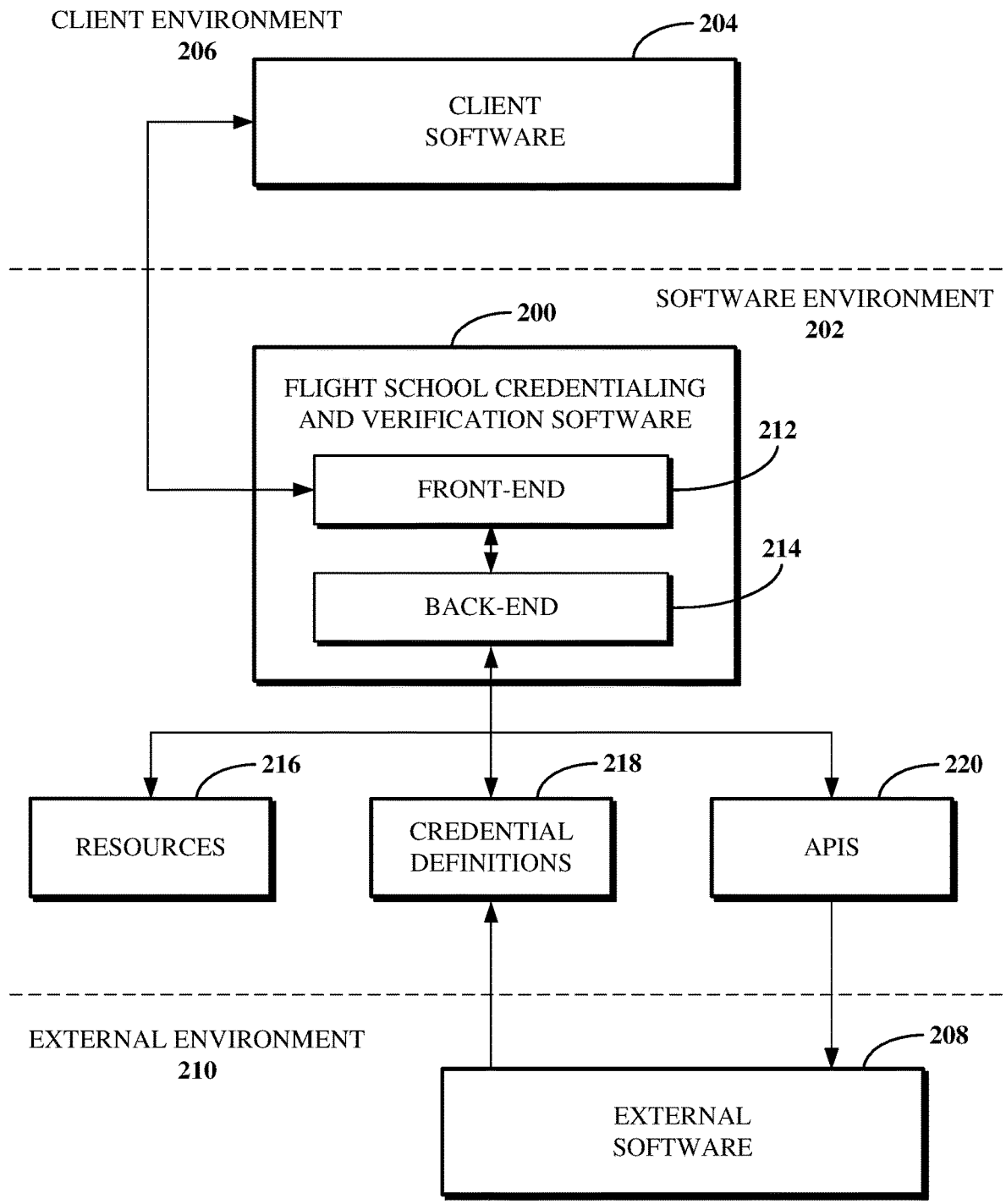
FIG. 2 is a block diagram showing an example of software and environments used with flight school credentialing and verification system.

FIG. 2 is a block diagram showing an example of software and environments used with flight school credentialing and verification system. As shown, a flight school credentialing and verification software application 200 is run in a software environment 202, client software 204 is run in a client environment 206, and external software 208 is run in an external environment 210.

The flight school credentialing and verification software application 200 is software run on a server, for example, the server device 102 shown in FIG. 1. For example, the flight school credentialing and verification system 200 may be the web application 104 shown in FIG. 1. The software environment 202 represents a computing environment within which the flight school credentialing and verification software application 200 is implemented. The software environment 202 may thus include hardware and/or software used to implement the flight school credentialing and verification software application 200. For example, the software environment 202 may be operated by a flight school. In another example, the software environment 202 may be operated by an entity separate from the flight school which provides the flight school credentialing and verification software application 200 for use by a flight school.

The flight school credentialing and verification software application 200 includes a front-end component 212 and a back-end component 214. The front-end component 212 includes functionality for delivering user interface elements and graphical user interface (GUI) features to a client device which runs the client software 204 and for communicating information received from the client software 204 to the back-end component 214. The back-end component 214 includes functionality for processing information received from the front-end component 212 using one or more of resources 216, credential definitions 218, or application programming interfaces (APIs) 220. Functionality of the flight school credentialing and verification software application 200 may thus be implemented using one or more of the resources 216, the credential definitions 218, or the APIs 220. Data indicative of or otherwise associated with one or more of the resources 216, the credential definitions 218, or the APIs 220 may be stored in a database accessible by the flight school credentialing and verification software application 200, for example, the database 106 shown in FIG. 1.

The resources 216 refer to or include resources of the flight school associated with the software environment 202 or the client environment 206. The resources of the flight school may refer to tangible or intangible aspects of or used by the flight school for which the flight school credentialing and verification software application 200 is implemented. For example, resources referred to by or otherwise included in the resources 216 may include, but are not limited to, aircraft, flight equipment other than aircraft, trainers, flight simulation equipment, classrooms, digital or physical school materials, aircraft fuel, products or services made available to the flight school through a third party, or the like.

The credential definitions 218 refer to or include credential definitions imposed by a regulatory body. The credential definitions imposed by a regulatory body may refer to rules or other requirements controlling the ability of a trainer or student of a flight school to participate in a flight course of the flight school. For example, credential definitions referred to by or otherwise included in the credential definitions 218 may include, but are not limited to, rules which implicate one or more credential items. Examples of credential items which may be implicated by a credential definition 218 include, but are not limited to, a rental agreement, a driver's license or other government-issued identification, a medical certificate, a pilot certificate, a student pilot certificate, an Integrated Airman Certification and Rating Application (IACRA), a birth certificate, a passport, a FAA MedXPress application, a visa, a Student and Exchange Visitor Information System (SEVIS) document, a TSA approval document, a syllabus enrollment document, certified flight instructor (CFI) information (e.g., name and/or certificate information of a primary and/or secondary CFI), a head shot photograph, a course enrollment certificate, a record folder, or the like. A regulatory body which imposes the credential definitions 218 is a governmental or non-governmental group which has authority to control flight school operation. Examples of such a regulatory body include, but are not limited to, the FAA or the TSA. In some cases, the types of credential items which may be implicated at a given time may be based on the particular user of the flight school credentialing and verification software application 200. For example, additional credential items which may be relevant for a trainer of or associated with a flight school may include biennial flight review certification, instruct proficiency check certification, flight currency, certified flight instructor certification, and various flight school administrivia (e.g., team member handbook acknowledgement, policy acknowledgements, tax documentation, drug test enrollment, or the like).

The APIs 220 refer to or include APIs of the external software 208, one or more third party software applications or tools, or other software used to deliver data and/or functionality of the flight school credentialing and verification software application 200. An API 220 may include various definitions of function calls for that software application or other software intended as an interface between that software application or other software and the flight school credentialing and verification software application 200. The APIs 220 may be received from a source external to the software environment 202 and/or developed within the software environment 202.

Although the flight school credentialing and verification software application 200 is described as having a front-end component 212 and a back-end component 214, the front-end component 212 and the back-end component 214 may be implemented using a common computing aspect. For example, a single framework, such as a PHP-based framework, may be used to implement both of the front-end component 212 and the back-end component 214. Alternatively, the front-end component 212 and the back-end component 214 may be implemented using different computing aspects.

The client software 204 is a software application or other software run on a client device, for example, the client device 108 shown in FIG. 1. For example, the client software 204 may be the web browser 112 shown in FIG. 1 or another software aspect which communicates with a server device which implements the flight school credentialing and verification software application 200. In this way, the client software 204 may transmit data to and/or receive data from the front-end component 212 of the flight school credentialing and verification software application 200. In some implementations, the client software 204 may be an agent installed on the client device. For example, the agent may be software used by the flight school credentialing and verification software application 200.

The client environment 206 represents a computing environment within which the client software 204 is implemented. The client environment 206 may thus include hardware and/or software used to implement the client software 204. For example, the client environment 206 may be operated by a customer, employee, or other person affiliated with a flight school. In another example, the client environment 206 may be operated by the flight school itself, such as where an entity separate from the flight school provides the flight school credentialing and verification software application 200 for use by a flight school.

The external software 208 is a software application or other software run on an external device, for example, a computing device in communication with the server device which implements the flight school credentialing and verification software application 200. The external software 208 may be a software aspect of a regulatory body from which the credential definitions 218 are received or retrieved. For example, the external software 208 may be a software aspect of the FAA and/or the TSA. Alternatively, the external software 208 may be a software aspect (e.g., a software application, tool, interface, or other aspect) of a third party from which data used by the flight school credentialing and verification software application 200 is received and/or which implements functionality used by the flight school credentialing and verification software application 200.

The external environment 210 refers to one or more hardware and/or software aspects used to implement the external software 208, which hardware and/or software aspects are located other than at a flight school associated with the flight school credentialing and verification software application 200.

Although a single reference to external software and an external environment are shown, multiple external software and multiple external environments may be implicated by the use and/or operation of the flight school credentialing and verification software application 200. For example, one or more external software and external environments each corresponding to one or more regulatory bodies may be used. In another example, one or more external software and external environments each corresponding to one or more third parties may be used. In yet another example, one or more external software and external environments each corresponding to either one or more regulatory bodies or one or more third parties may be used.

The use of the term "external" to describe the external software 208 or the external environment 210 refers to the external aspect being external to a client-server relationship directly between a client device which runs the client software 204 and a server device which runs the flight school credentialing and verification software application 200. There may be multiple environments considered to be within the external environment 210. For example, the external environment 210 may include one or more of an external environment operated by a regulatory agency which imposes the credential definitions 218, an external environment operated by a third party for the purpose of running third party software which may or may not be integrated with the flight school credentialing and verification software 200, or another environment considered to be external to the client-server relationship.

In some implementations, the flight school credentialing and verification software application 200 may be run locally at a computing device other than a server device (e.g., the server device 102 shown in FIG. 1). For example, the flight school credentialing and verification software application 200 may be accessed at a computing device located at a flight school. In some such implementations, the flight school credentialing and verification software application 200 may still have access to a network (e.g., the network 112 shown in FIG. 1). For example, the flight school credentialing and verification software application 200 may access the network to retrieve or receive information related to the resources 216, the credential definitions 218, and/or the APIs 220.

In some implementations, the flight school credentialing and verification software application 200 may be implemented in a platform-as-a-service (PaaS) software product. For example, the flight school credentialing and verification software application 200 may be a single-tenant or multi-tenant software platform implemented using one or more network devices, including a hardware server, a web server, a virtual machine, a hypervisor, or the like. A client of the PaaS product may be a flight school. A single-tenant software platform implementation of the PaaS product would enable individual flight school clients to operate separate environments from one another in which data used to instantiate the platform is particular to clients of a given flight school client. A multi-tenant software platform implementation of the PaaS product would enable multiple flight school clients to operate within a common environment, such as in which a single platform instantiation connects multiple clients.

In some implementations, the flight school credentialing and verification software application 200 may be implemented in a software-as-a-service (SaaS) software product. For example, the flight school credentialing and verification software application 200 may be a network-implemented software product accessible using hardware and software server implementations. For example, a client of the SaaS product may be a student, trainer, or staff member of a flight school. The SaaS product may be portable, such as between software environments and/or otherwise over a network.

In some such implementations, the flight school credentialing and verification software application 200 may need to update at least some of the credential definitions 218 from time to time, such as according to the changes made by a regulatory body. In such a case, whether the flight school credentialing and verification software application 200 is implemented as a PaaS product or a SaaS product, updating the credential definitions 218 may include updating database records of instances of some or all of the customers according to the changes made by the regulatory body.

In some implementations, information, such as sensor measurements, component condition indications, or the like, may be communicated directly from an on-board computer of an aircraft to a server device used to implement the flight school credentialing and verification software application 200 over a network. For example, the on-board computer of an aircraft may automatically transmit hour meter (HOBBS) information to the server device using a Wi-Fi connection. For example, the automatic transmission may be periodic, such as at discrete intervals. In another example, the automatic transmission may be non-periodic, such as at the end of a flight session (e.g., upon landing, engine shut down, power down, or another condition indicative of the end of a flight session).

In some such implementations, the flight school credentialing and verification software application 200 may use the information transmitted from the on-board computer of an aircraft to update a scheduling aspect of the flight school credentialing and verification software application 200. For example, where information received from an on-board computer of an aircraft indicates that a component of the aircraft may be malfunctioning or is due for maintenance, that aircraft may be de-listed from session scheduling functionality of the flight school credentialing and verification software application 200, and users who have flight course sessions scheduled within a maintenance window for evaluating the condition of the aircraft may be rescheduled.

Figure 3:
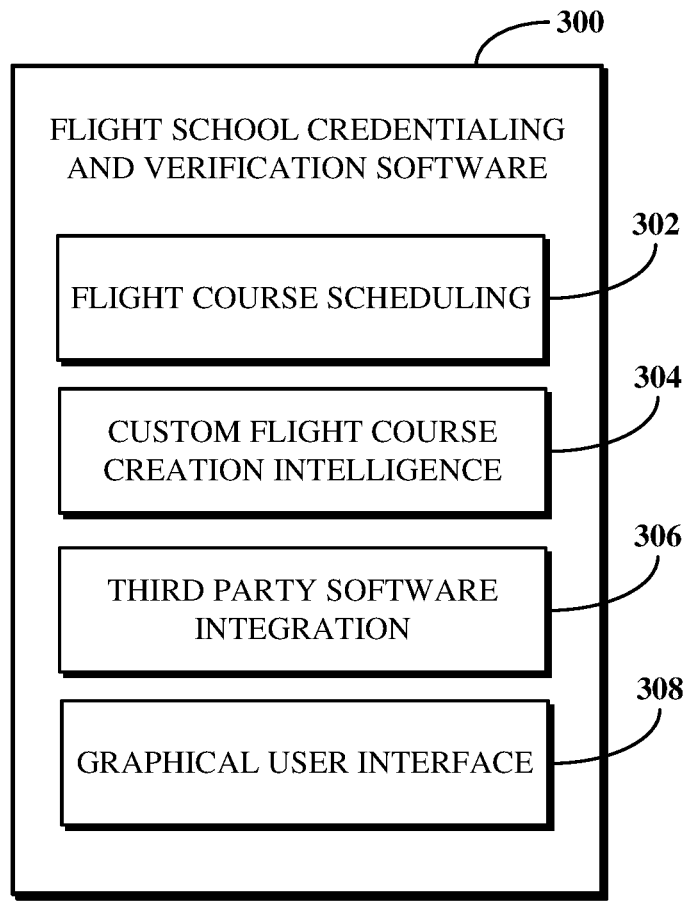
FIG. 3 is a block diagram showing examples of functionality of a flight school credentialing and verification software application.

FIG. 3 is a block diagram showing examples of functionality of a flight school credentialing and verification software application 300, which may, for example, be the flight school credentialing and verification software application 200 shown in FIG. 2. The flight school credentialing and verification software application 300 includes a flight course scheduling tool 302, a custom flight course creation intelligence tool 304, a third party software integration tool 306, and a GUI 308.

The flight course scheduling tool 302 is a front-end software tool used by a user (e.g., a student, trainer, or staff member of a flight school) of the flight school credentialing and verification software application 300 to schedule one or more flight course sessions with the flight school. The flight course scheduling tool 302 uses input received from the user to determine whether to schedule a single flight course session or to schedule a series of multiple flight course sessions. The input received from the user may indicate one or more of a name or other identifier of the user, a particular flight school goal of the user (e.g., for a student, working toward a Part 61 certificate or a Part 141 certificate). The flight course scheduling tool 302 references the user input against information associated with resources of the flight school and credential definitions relating to the type of flight course session being scheduled to present one or more options for the user to select to schedule the respective flight course session or sessions. The flight course scheduling tool 302 may be used to schedule flight course sessions for a flight course with which a student of the flight school is already registered or to schedule flight course sessions for a flight course with which the student is not yet registered.

The custom flight course creation intelligence tool 304 is a front-end software tool used by a user (e.g., a student of a flight school, a trainer of or associated with a flight school, or a staff member of a flight school) of the flight school credentialing and verification software application 300 to create a new flight course for the user. The new flight course may, for example, refer to a flight course offering already available for scheduling using the flight course scheduling tool 302 or to a flight course which was not previously made available for scheduling using the flight course scheduling tool 302. The new flight course may be created using a customization process specific to the user or otherwise using information specific to the user. The custom flight course creation intelligence tool 304 uses input received from the user to determine a particular flight school goal of the user and to determine which items of various credential definitions may be available. The custom flight course creation intelligence tool 304 references the user input against information associated with resources of the flight school and credential definitions relating to one or more types of flight course to create a flight course session or a series of multiple flight course sessions directed to the particular flight school goal indicated in the user input. The custom flight course creation intelligence tool 304 may, for example, select a starting flight course based on the goal and skills of the user and then customize that starting flight course according to that goal and those skills.

The third party software integration tool 306 is a back-end software tool used to implement functionality derived from external software, for example, the external software 208 shown in FIG. 2. The third party software integration tool 306 may use APIs (e.g., the APIs 220) to transmit data to and/or receive or retrieve data from external software. Examples of functionality which may be implemented at the flight school credentialing and verification software application 300 using the third party software integration tool 306 include, but are not limited to, integrations with learning management software, integrations with regulatory body software or information, integrations with universities or other educational facilities, or the like. The third party software integration tool 306 operates mediate between the flight school credentialing and verification software application 300 and the external software, for example, by acting as an intermediary enabling an exchange of information and/or functionality between the flight school credentialing and verification software application 300 and one or more external software aspects.

The GUI 308 is a GUI which may be rendered or displayed, such as to render or display pages of the flight school credentialing and verification software application 300 for use. The GUI 308 can comprise part of a software GUI constituting data that reflect information ultimately destined for display on a hardware device, for example, the client device 102 shown in FIG. 1). For example, the data can contain rendering instructions for bounded graphical display regions, such as windows, or pixel information representative of controls, such as buttons and drop-down menus. The rendering instructions can, for example, be in the form of HTML, SGML, JavaScript, Jelly, AngularJS, or other text or binary instructions for generating the GUI 308 or another GUI on a display that can be used to generate pixel information. A structured data output of one device can be provided to an input of the hardware display so that the elements provided on the hardware display screen represent the underlying structure of the output data.

Figure 4:
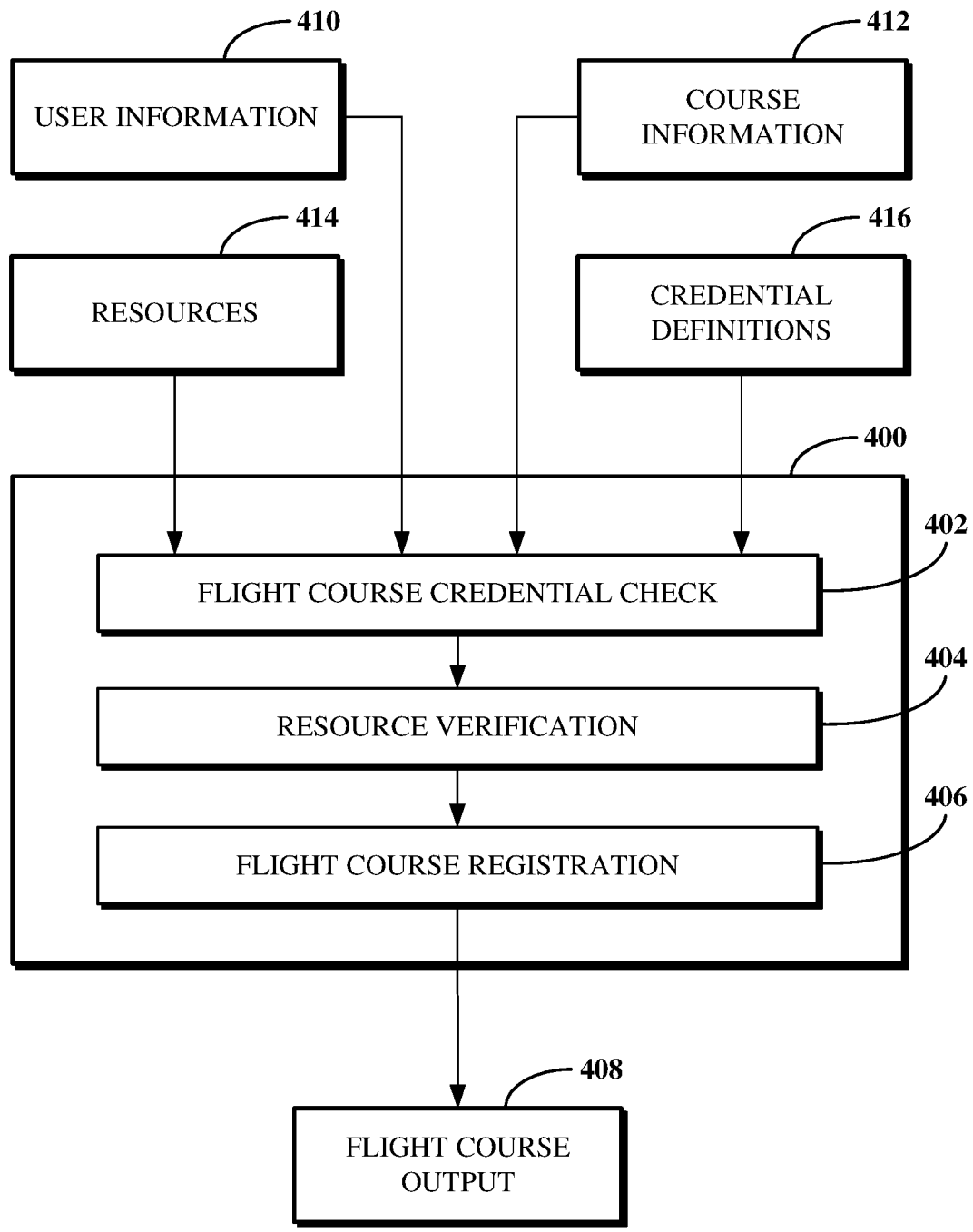
FIG. 4 is a block diagram showing an example of flight course scheduling tool of a flight school credentialing and verification software application.

FIG. 4 is a block diagram showing an example of flight course scheduling tool 400 of a flight school credentialing and verification software application. For example, the flight course scheduling tool 400 may be the flight course scheduling tool 302 shown in FIG. 3. The flight course scheduling tool 400 includes a flight course credential check aspect 402, a resource verification aspect 404, and a flight course registration aspect 406. Each of the flight course credential check aspect 402, the resource verification aspect 404, and the flight course registration aspect 406 represents functionality of the flight course scheduling tool 400 and may be expressed in one or more ways, for example, as a software feature, subroutine, or other component of the flight course scheduling tool 400.

The flight course scheduling tool 400 uses various information about a user and a flight school to determine a flight course session or a series of multiple flight course sessions with which to register the user. The flight course scheduling tool 400 processes inputs using the flight course credential check aspect 402, the resource verification aspect 404, and the flight course registration aspect 406 to generate flight course output 408. The flight course output 408 represents a registration of a user of the flight course scheduling tool 400 for a single flight course or for a series of multiple flight courses. The inputs used by the flight course scheduling tool 400 include user information 410, course information 412, resources 414, and credential definitions 416.

The user information 410 includes information identifying a user of the flight course scheduling tool 400, which user may be a student of a flight school, a trainer of a flight school, or a staff member of a flight school. The user information 410 identifies the user, for example, by name or a registration number known to the flight course scheduling tool 400. The course information 412 includes information identifying a flight course for which the user seeks to register. For example, the course information 412 may include syllabus information for a flight course, an indication of a certificate the user seeks, or the like. The resources 414 and the credential definitions 416 may, for example, respectively be the resources 216 and the credential definitions 218 shown in FIG. 2.

In some implementations, the user information 410 may identify a client type of the student for whom the flight course or series thereof is being scheduled. Examples of client types which may be identified in the user information 410 include, but are not limited to, discovery, scenic, instructional, solo, and rental. For example, each of the client types may have different resource requirements and/or different credential definitions implicated. As such, the use of a client type to further filter information for flight course registration may further enhance the ability of the flight course scheduling tool 400 in generating a relevant registration as the flight course output 408.

The user information 410 may be directly input to the flight course scheduling tool 400 by a user of the flight school credentialing and verification software application. In other cases, may be retrieved from a data store accessible by the flight course scheduling tool 400, or both. For example, the user information 410 may be or include information previously provided by a student of a flight school or by a trainer of or associated with the flight school. The previously provided user information 410 may stored in a data store (e.g., the database 106 shown in FIG. 1) for use with the flight school credentialing and verification software application.

In some implementations, rules defined by or for the flight course scheduling tool 400 may be used to automatically update items implicated by certain of the credential definitions 416. The flight course scheduling tool 400 may, at a periodic basis (e.g., at discrete time intervals) or non-periodic basis (e.g., upon user request or other signal indicating to do so) check the user information 410 stored in a data store to verify the status thereof. For example, the flight course scheduling tool 400 may review medical certificate information of a user to determine whether the medical certificate has expired, such as based on a current age of the relevant student and a date of the medical examination which led to the medical certificate being issued. In another example, the flight course scheduling tool 400 may review the last date of a biennial flight review to determine whether a privilege or certificate of a student has expired. In yet another example, the flight course scheduling tool 400 may identify changes to a rental agreement and determine based thereon whether a new signature is required thereon.

The flight course credential check aspect 402 processes the user information 410 and the course information 412 against the credential definitions 416 to verify user credentials for accessing the subject flight course. Depending on the particular flight course, different credential definitions 416 may be implicated. For example, where the course is a solo student private pilot license flight course, the credential items implicated may be a rental agreement, a driver's license or other government-issued identification, a medical certificate, a student pilot certificate, an IACRA certificate, a birth certificate, a passport, a FAA MEDXpress application, a syllabus enrollment document, certified flight instructor information, biennial flight review certification, and flight currency. In another example, where the course is a solo instrument flight rules flight course, the same credential items as listed above may be implicated, except that a student pilot certificate and IACRA certificate may not be implicated and an instrument proficiency check certificate may instead be implicated.

Furthermore, values of the user information 410 may also in some cases implicate different credential definitions 416. For example, where the user information 410 indicates an instructional client type, a user resident credential definition may be used to verify a country of residence of the user before the user may be allowed to register for certain types of courses. Further credential definitions 416 may be implicated based on the user residence information. For example, there may be four different sets of credential definitions 416 implicated based on whether the user is a U.S. resident and whether the flight course is a Part 61 course or a Part 141 course.

The credential definitions 416 used by the flight course credential check aspect 402 may be received or retrieved from an external environment, for example, a computing aspect operated by the FAA or the TSA. The flight course credential check aspect 402 may receive updates on the credential definitions 416 when pushed from such a computing aspect, or it may check for and potentially retrieve updates on the credential definitions 416 from such a computing aspect at a periodic or non-periodic basis. The credential definitions 416 are used not simply to ensure that a user of the flight course scheduling tool 400 has the capability and capacity to fly an aircraft in an intended flight course, but also that the flight school is operating under the strict safety requirements set in place by the relevant regulatory bodies. Thus, the flight course credential check aspect 402 uses the credential definitions 416 to prevent or at least limit the possibility of a person being assigned an inappropriate aircraft at an inappropriate date or time for an inappropriate purpose.

Where the flight course credential check aspect 402 analyzes the user information 410 and the course information 412 against the credential definitions 416 and determines that the requirements set forth by the relevant credential definitions 416 are not met, the flight course scheduling tool 400 reports an error to the user thereof indicating that the desired flight course cannot be registered by the user. In some implementations, the flight course scheduling tool 400 may report the particular credential item or credential items which are deficient. However, where the flight course credential check aspect 402 analyzes the user information 410 and the course information 412 against the credential definitions 416 and determines that the requirements set forth by the relevant credential definitions 416 are met, the resource verification aspect 404 proceeds to verify the availability of the resources necessary for the subject flight course.

The resource verification aspect 404 processes the course information 412 against the resources 414 to verify resource availability. In particular, the resource verification aspect 404 processes the course information 412 to determine the resources 414 which are required for the course, and the resource verification aspect 404 then checks a record of availability for the required resources 414 to determine whether those required resources 414 are already in use at a given time. For example, where a particular type of aircraft and a particular trainer are required for a subject flight course, but that each unit of that particular type of aircraft is already reserved through the end of a given month, the resource verification aspect 404 will report that availability. In some implementations, the user information 410 or the course information 412 may indicate a time requirement for completion of a flight course. In some such implementations, where the resource verification aspect 404 determines that a resource required for that flight course is not available for the user to complete the flight course by the end of the time requirement, the flight course scheduling tool 400 may report an error indicating that a flight course could not be registered.

In the event the required resources are available, as verified using the resource verification aspect 404, the flight course registration aspect 406 may present a list of flight course dates and times for user selection. For example, a list of flight course dates and times may be output for display at a GUI of the flight school credentialing and verification software application. Alternatively, the flight course registration aspect 406 may instead automatically register for an earliest available date and time for the flight course, or, where the user seeks to register for a series of flight course sessions, for an earliest available date and time for the first flight course session. In either case, the flight course output 408 is generated upon the registration of a flight course using the flight course registration aspect 406. An indication of the flight course output 408 is stored by the flight course credentialing and verification software application. An indication of the flight course output 408 may also be transmitted to a client device of the user.

In some implementations, the flight course scheduling tool 400 may check existing flight course registrations for conflicts resulting from a change in the user information 410, in the course information 412, in the resources 414, and/or in the credential definitions 416. For example, where the FAA or the TSA creates a new requirement or changes an existing requirement (e.g., as indicated in one or more of the credential definitions 416) for a particular flight course, the flight course scheduling tool 400 may process some or all existing registrations for that flight course and determine whether the user information 410 and the resources 414 are in compliance with the new or changed requirement. In the event either is not in such compliance, the flight course scheduling tool 400 may revoke the applicable registration and transmit notice of the revocation to one or more users of the flight school credentialing and verification software application.

Figure 5:
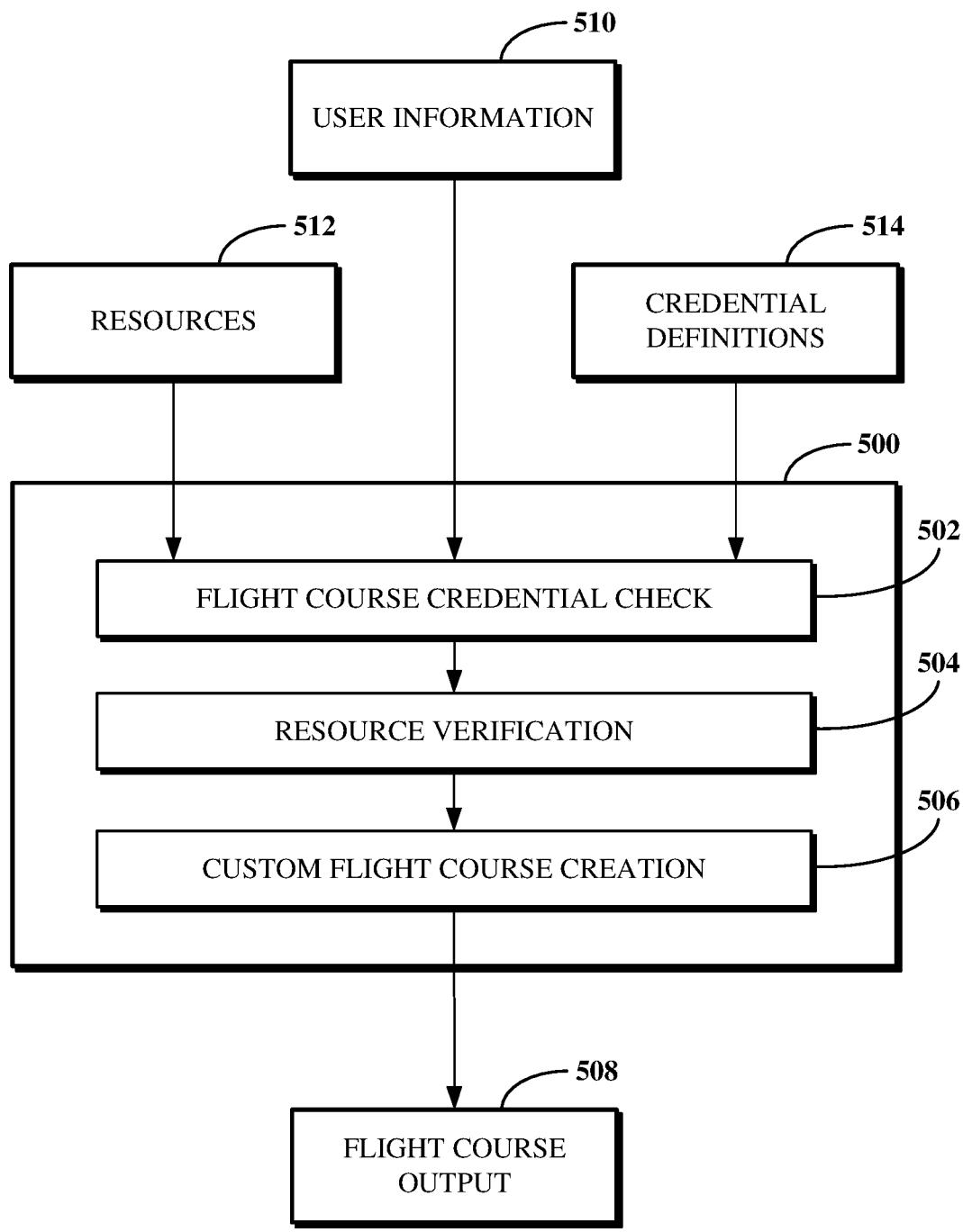
FIG. 5 is a block diagram showing an example of custom flight course creation intelligence tool of a flight school credentialing and verification software application.

FIG. 5 is a block diagram showing an example of custom flight course creation intelligence tool 500 of a flight school credentialing and verification software application. For example, the custom flight course creation intelligence tool 500 may be the custom flight course creation intelligence tool 304 shown in FIG. 3. The custom flight course creation intelligence tool 500 includes a flight course credential check aspect 502, resource verification aspect 504, and a custom flight course creation aspect 506. Each of the flight course credential check aspect 502, the resource verification aspect 504, and the custom flight course creation aspect 506 represents functionality of the custom flight course creation intelligence tool 500 and may be expressed in one or more ways, for example, as a software feature, subroutine, or other component of the custom flight course creation intelligence tool 500.

The custom flight course creation intelligence tool 500 uses various information about a user and a flight school to customize a flight course based on the specific needs and skills of the user. The custom flight course creation intelligence tool 500 processes inputs using the flight course credential check aspect 502, the resource verification aspect 504, and the custom flight course creation aspect 506 to generate flight course output 508. The flight course output 508 represents a registration of a user of the custom flight course creation intelligence tool 500 with a custom flight course. The inputs used by the custom flight course creation intelligence tool 500 include user information 510, resources 512, and credential definitions 514.

The user information 510 may be the same as the user information 410 shown in FIG. 4, except that the user information 510 further includes an indication of a goal of the user relative to the flight school. For example, the goal of the user may refer to a particular certification or skill which the user may acquire by completing one or more flight courses with the flight school. The resources 512 may be the same as the resources 414 shown in FIG. 4. The credential definitions 514 may be the same as the credential definitions 416 shown in FIG. 4.

Certain functionality of the custom flight course creation intelligence tool 500 may be similar to or the same as functionality of the flight course scheduling tool 400 shown in FIG. 4. For example, the flight course credential check aspect 502 may perform functionality similar to that of the flight course credential check aspect 402 shown in FIG. 4, except that the flight course credential check aspect 502 may search through multiple flight course types to determine a starting flight course to customize. In another example, the resource verification aspect 504 may perform functionality similar to that of the resource verification aspect 404 shown in FIG. 4.

Regarding the flight course credential check aspect 502, the starting flight course is a flight course determined by the flight course credential check aspect 502 based on elements of the user information 410, for example, one or more of the goal of the user, residency information of the user, and a client type of the user. For example, where the user is a US resident and has a student pilot certificate with the goal of being able to fly an aircraft on his or her own, the flight course credential check aspect 502 may determine the starting flight course to be either a Part 61 private pilot license course or a Part 141 private pilot license course.

Once the starting flight course is determined, the flight course credential check aspect 502 may check to confirm whether credential definitions 514 associated with that flight course are met. If those credential definitions 514 are not met, a different flight course may be used as the starting flight course. Otherwise, the resource verification aspect 504 proceeds to verify the availability of resources 512 required for the starting flight course.

After the availability of the required resources 512 is verified using the resource verification aspect 504, the custom flight course creation aspect 506 customizes the starting flight course according to the goal and skills of the user. For example, additional lessons may be added where the skill level of the user is below an expected entry level, or certain lessons may be removed where the skill level of the user is above the expected entry level. In another example, supplemental lessons may be added which differ in scope from the lessons of the starting flight course, but are nonetheless related to a degree. For example, lessons using a flight simulator or directed to a specific focus such as ground training may be used to supplement the starting flight course based on the goal and skills of the user. The flight course output 508 is then generated to represent the customized flight course.

In some implementations, the custom flight course creation aspect 506 may generate multiple possible custom flight courses for the user. In some such implementations, the multiple possible custom flight courses may be ranked, such as according to a relevance to a goal of the user, a skillset of the user, other criteria, or a combination thereof.

Figure 6:
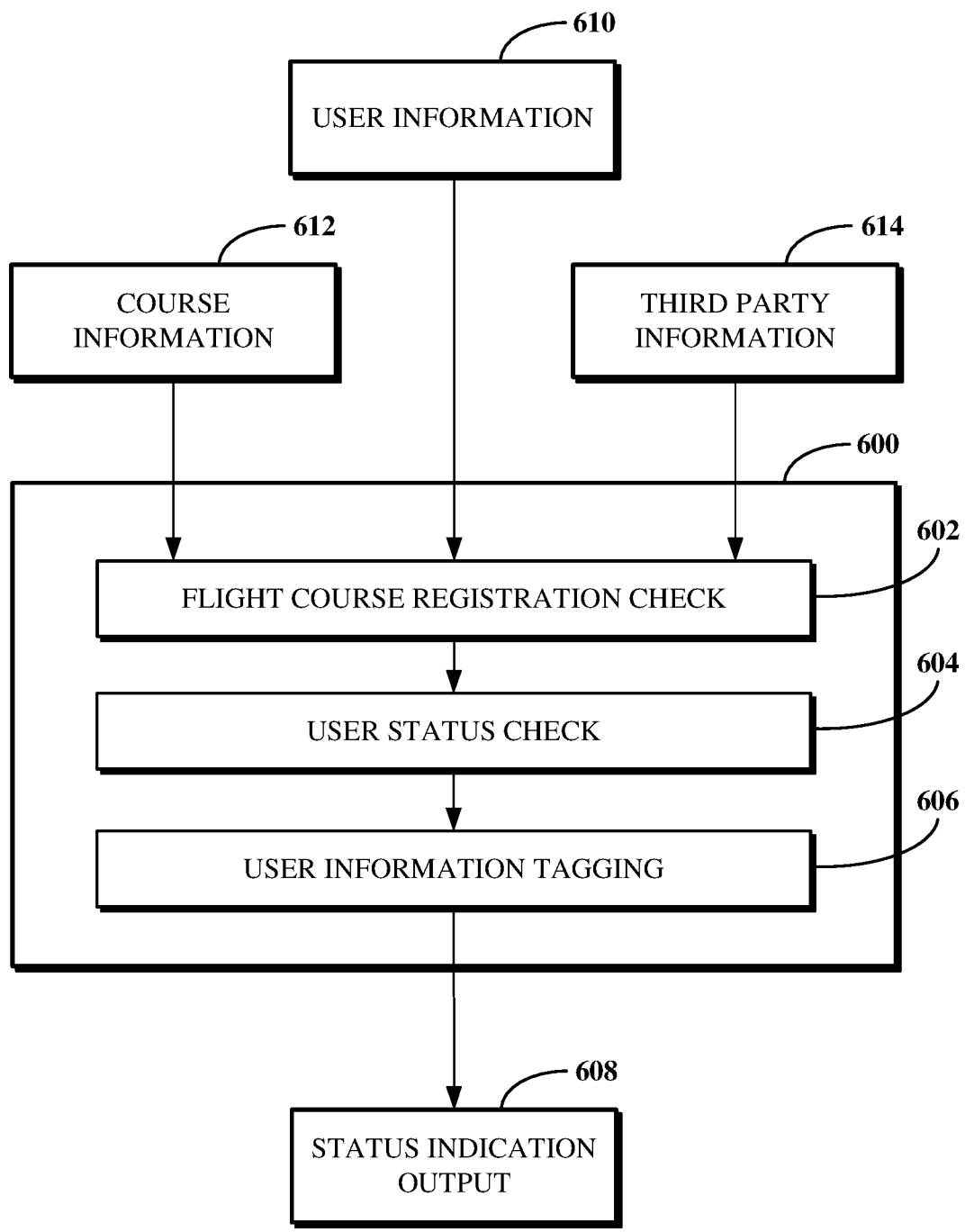
FIG. 6 is a block diagram showing an example of third party software integration tool of a flight school credentialing and verification software application.

FIG. 6 is a block diagram showing an example of third party software integration tool 600 of a flight school credentialing and verification software application. For example, the third party software integration tool 600 may be the third party software integration tool 306 shown in FIG. 3. The third party software integration tool 600 includes a flight course registration check aspect 602, a user status check aspect 604, and a user information tagging aspect 606. Each of the flight course registration check aspect 602, the user status check aspect 604, and the user information tagging aspect 606 represents functionality of the third party software integration tool 600 and may be expressed in one or more ways, for example, as a software feature, subroutine, or other component of the third party software integration tool 600.

The third party software integration tool 600 uses APIs and/or other software aspects to integrate functionality of third party software with the flight school credentialing and verification software application. The third party software may, for example, be learning management software operated by a flight school, a flight system, or another entity related to flight training; a software application or tool operated by a regulatory body for communicating flight requirements or changes thereto; educational software operated by a university or other educational facility associated with flight or flight training; or the like. Examples of functionality of the third party software which may be integrated into the flight school credentialing and verification software application using the third party software integration tool 600 include, but is not limited to, monitoring student coursework data and/or analytics data of the learning management software to determine products or services which may have value in assisting the student to achieve an intended flight goal, tagging student information to indicate a current status of a flight course, or the like.

The third party software may be integrated with the flight school credentialing and verification software application in one or more ways, including, for example, using a common user account with shared login information, or simply using common login information. In some implementations, an API of the third party software (e.g., one of the APIs 220 shown in FIG. 2) may be used to link the third party software with the flight school credentialing and verification software application.

The third party software integration tool 600 processes inputs using the flight course registration check aspect 602, the user status check aspect 604, and the user information tagging aspect 606 to generate a status indication output 608. The status indication output 608 represents information configured for use by the third party software. For example, the status indication output 608 may be or include an indication of a product or service which may be valuable to the subject student. In another example, the status indication output 608 may be or include an indication of a current progress of the subject student through a flight course. The inputs used by the third party software integration tool 600 include user information 610, course information 612, and third party information 614.

The user information 610 and the course information 612 may respectively be the same as or similar to the user information 410 and the course information 412 shown in FIG. 4. The third party information 614 represents information received from the third party software. For example, the third party information 614 may be or include information about flight education homework or classes in which a student of the flight school is enrolled, such as in addition to registration in a flight course of the flight school.

The flight course registration check aspect 602 receives the user information 610, the course information 612, and the third party information 614 and determines whether a user of the flight school credentialing and verification software application (e.g., a student of the flight school which operates that software application or for which that software application is operated) is registered with a flight course of the flight school. Responsive to a determination that the user is registered with a flight course of the flight school, the user status check aspect 604 determines status information for the user. The status information may be or include progress through a flight education class or flight education homework, progress through the registered flight course, or the like.

The user information tagging aspect 606 receives an indication of the status information determined using the user status check aspect 604 and tags that indication in a manner which will configure the third party software to be able to process it. The tagged indication is generated as the status indication output 608. For example, where the third party software is learning management software, the tagged indication may be some data indicating that the user has completed a certain portion of a flight class, has completed a certain number of flight training sessions, has yet to complete a flight training test or session, or the like. In another example, where the third party software is software operated by a university or other educational facility, the tagged indication may be some data indicating that the user has fulfilled a training aspect required by the university or other educational facility, such as for a condition of completing an educational course or of granting a diploma or certificate. The status indication output 608 may then be transmitted to the third party software for further processing.

Figure 7:
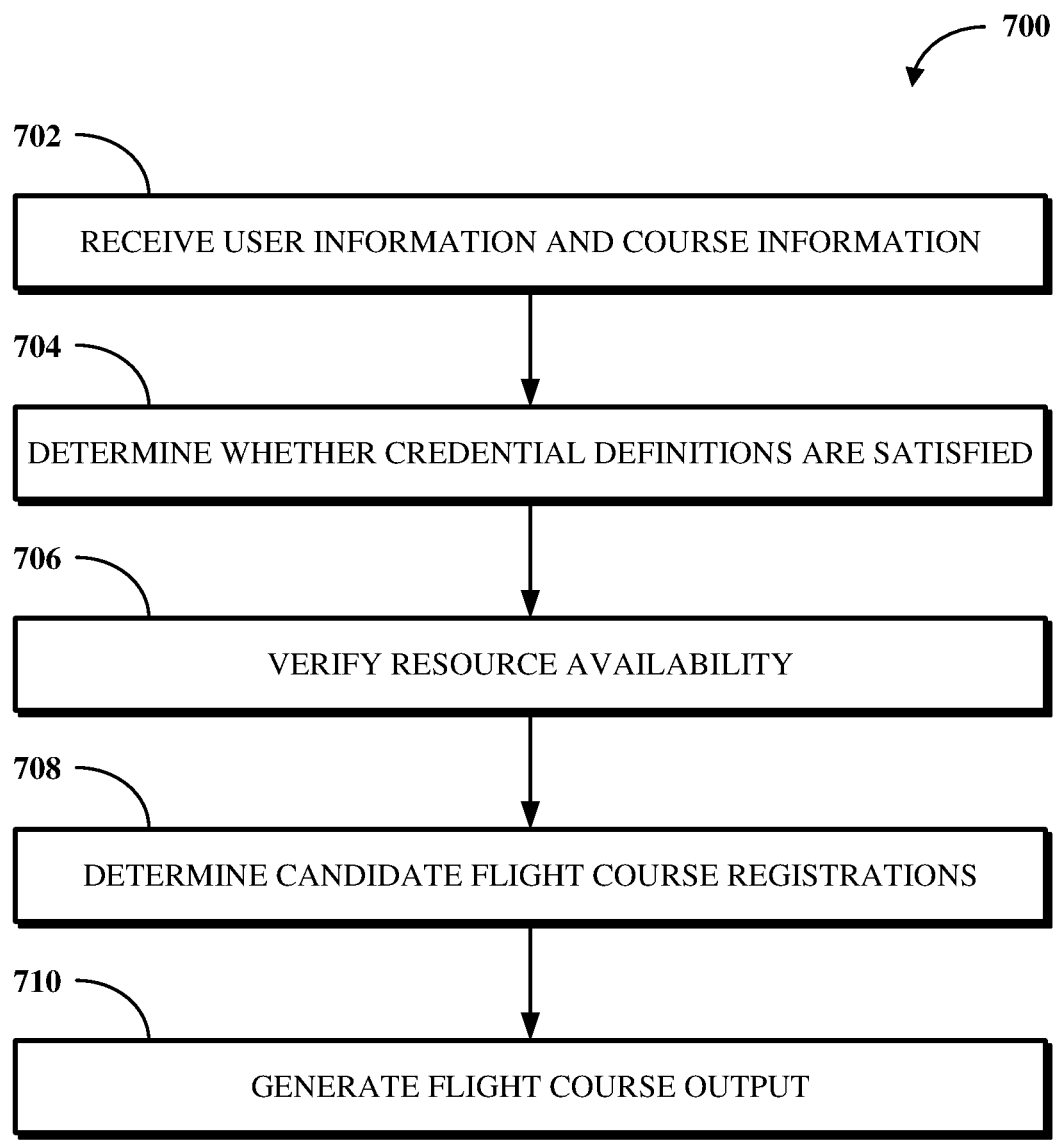
FIG. 7 is a flowchart showing an example of a technique for flight course scheduling using a flight school credentialing and verification system.
Figure 8:
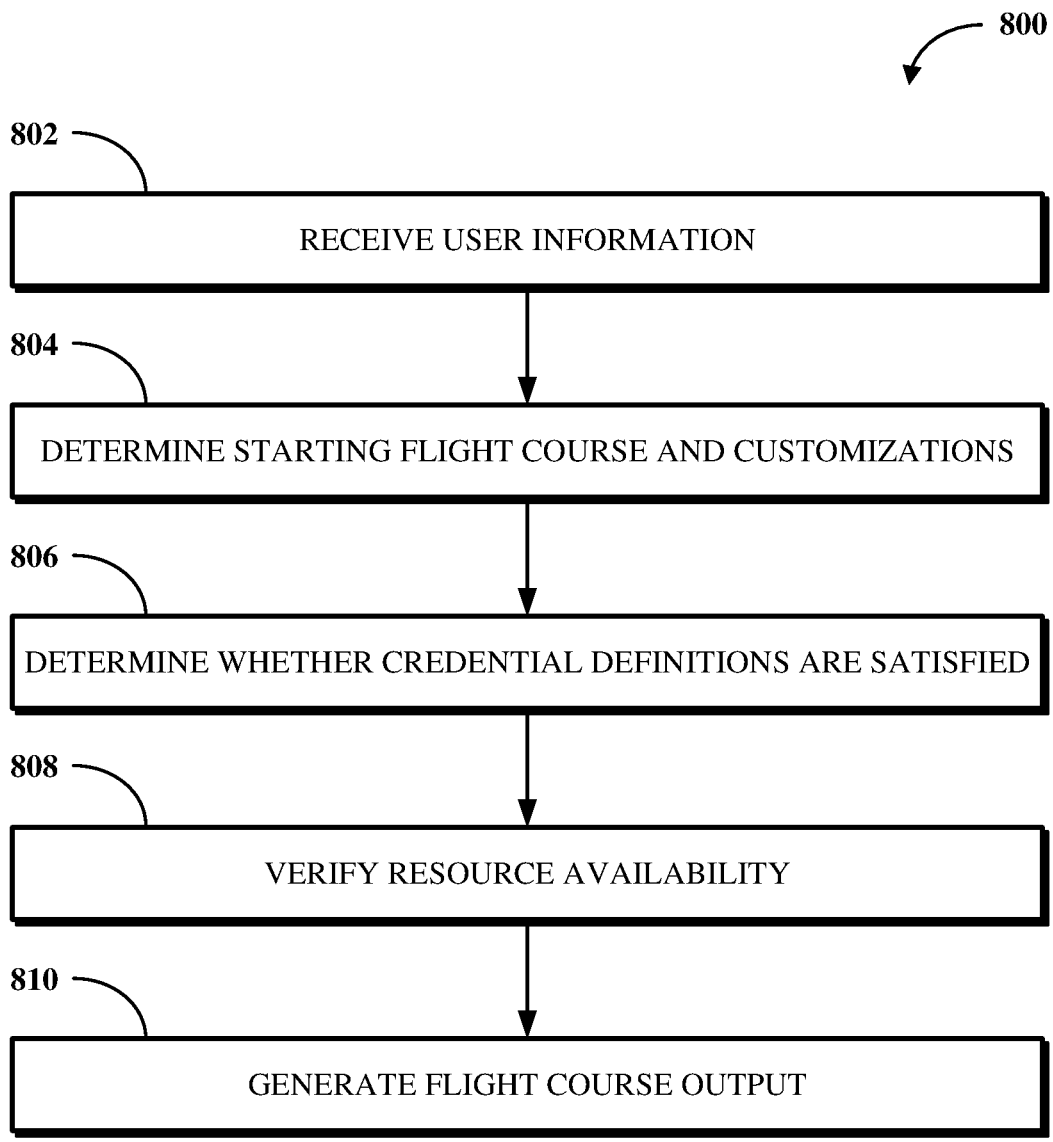
FIG. 8 is a flowchart showing an example of a technique for custom flight course creation intelligence using a flight school credentialing and verification system.
Figure 9:
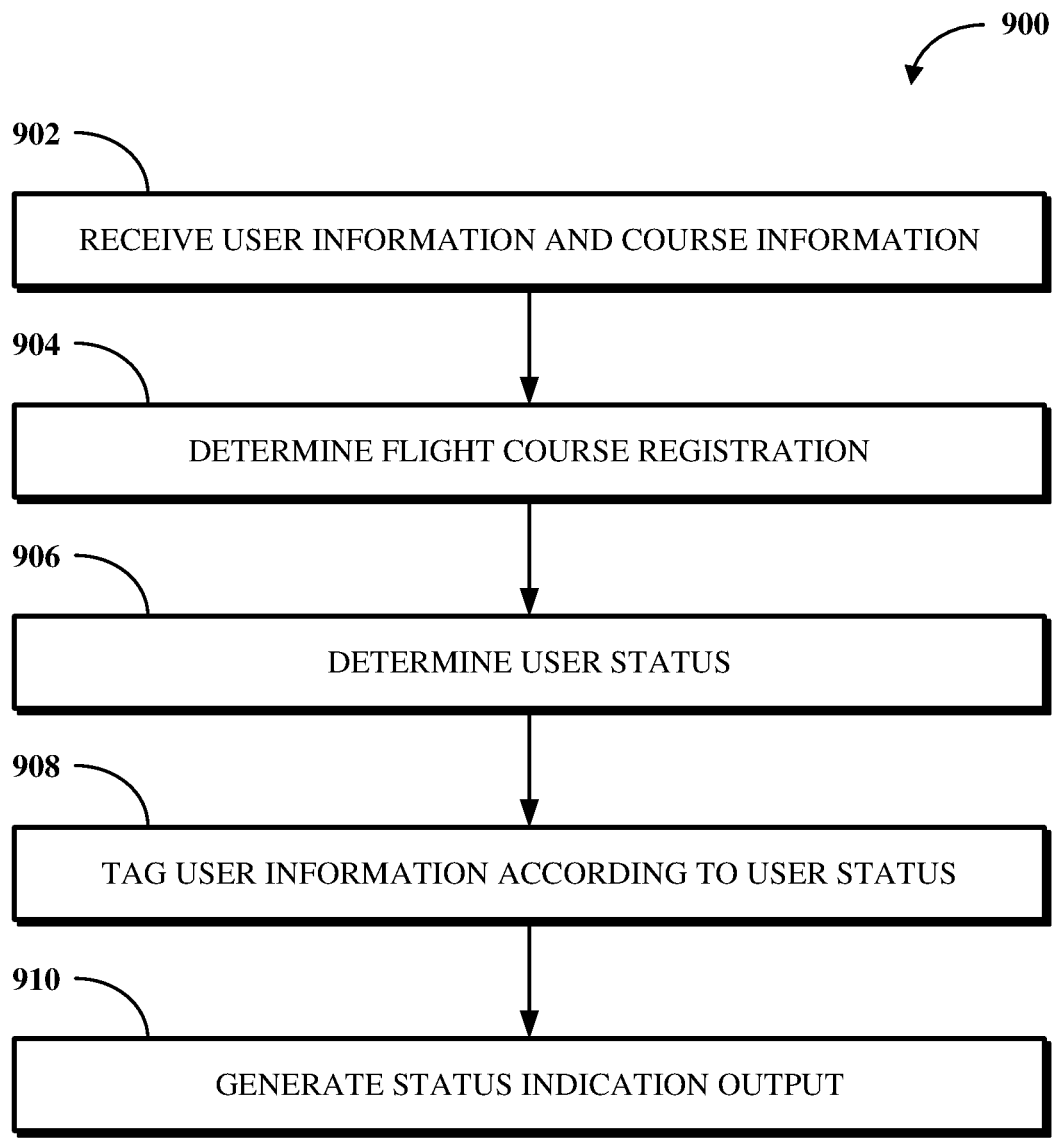
FIG. 9 is a flowchart showing an example of a technique for third party software integration using a flight school credentialing and verification system.

To further describe some implementations in greater detail, reference is next made to examples of techniques which may be performed by or using a region-based electrical intelligence system as described with respect to FIGS. 1-6. FIG. 7 is a flowchart showing an example of a technique 700 for flight course scheduling using a flight school credentialing and verification system. FIG. 8 is a flowchart showing an example of a technique 800 for custom flight course creation intelligence using a flight school credentialing and verification system. FIG. 9 is a flowchart showing an example of a technique 900 for third party software integration using a flight school credentialing and verification system.

The technique 700, the technique 800, and/or the technique 900 can be executed using computing devices, such as the systems, hardware, and software described with respect to FIGS. 1-6. The technique 700, the technique 800, and/or the technique 900 can be performed, for example, by executing a machine-readable program or other computer-executable instructions, such as routines, instructions, programs, or other code. The steps, or operations, of the technique 700, the technique 800, and/or the technique 900, or another technique, method, process, or algorithm described in connection with the implementations disclosed herein, can be implemented directly in hardware, firmware, software executed by hardware, circuitry, or a combination thereof.

For simplicity of explanation, the technique 700, the technique 800, and the technique 900 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 7, the technique 700 for flight course scheduling using a flight school credentialing and verification system is shown. The technique 700 represents operations which may be performed by or using a flight course scheduling tool of a flight school credentialing and verification software application, for example, the flight course scheduling tool 400 shown in FIG. 4.

At 702, user information and course information are received. The user information is indicative of credential items of a user of the flight school credentialing and verification software application. The course information is indicative of a flight course for which the user seeks registration. The user information and the course information may be received from a client device of the user, a data store that stores the user information and the course information, input directly by the user into a computing device which implements the flight school credentialing and verification system, or the like.

At 704, a determination is made as to whether the credential items of the user related to the flight course satisfy one of more credential definitions. The credential definitions are indicative of flight course requirements defined by a regulatory body and are defined for the flight course for which the user seeks registration. Determining whether a credential item satisfies a credential definition includes determining the credential definitions which are relevant for the flight course and then determining values that satisfy those relevant credential definitions. The credential items of the user are then compared to those values to finally determine whether the credential definitions are satisfied.

At 706, responsive to a determination that the credential items satisfy the one or more credential definitions, an availability of one or more resources of the flight school is verified. The resources are or refer to resources which are used for the flight course. The verification is performed using resource information of the flight school credentialing and verification system, for example, which indicates status information and existing registrations for the various resources of the flight school. A resource is verified as being available if the resource is not already intended to be in-use at all times for which sessions of the desired flight course may be registered by the user.

At 708, responsive to a verification of the availability of the resources, one or more candidate flight course registrations are determined. Each of the candidate flight course registrations corresponds to a different date or time. In some implementations, a candidate flight course registration may correspond to a series of multiple sessions for the desired flight course. In other implementations, a candidate flight course registration may correspond to a single session for the desired flight course.

At 710, flight course output indicative of a selected flight course registration of the candidate flight course registrations is generated. The selected flight course registration is one of the candidate flight course registrations which has been selected for registration of the user. The flight course registration may be selected by the user or by the flight school credentialing and verification system. For example, the candidate flight course registrations may be output to a display of a computing device for selection by the user. In another example, the candidate flight course registrations may be evaluated based on user preferences (e.g., date, time, and/or other preferences established by or for the user) and one selected based on those user preferences.

In some implementations, the technique 700 may include updating at least some of the credential definitions according to changes made by the regulatory body to at least some of the flight course requirements. For example, a regulatory body which defines the credential definitions, such as the FAA or the TSA, may change certain flight course requirements, which causes the credential definitions to become updated.

In some such implementations, an existing flight course registration corresponding to one or more of the at least some flight course requirements may be identified. A determination may be made as to whether the at least some credential definitions updated according to the changes to the at least some flight course requirements are satisfied by credential items of the user. Responsive to a determination that the at least some credential definitions updated according to the changes to the at least some flight course requirements are satisfied by the credential items of the user, the existing flight course registration may be maintained. However, responsive to a determination that the at least some credential definitions updated according to the changes to the at least some flight course requirements are not satisfied by the credential items of the user, the existing flight course registration may be revoked. In such a case, a notification may be transmitted to a client device of the user to indicate the revocation of the existing flight course registration.

In some such implementations, an indication of the changes made by the regulatory body to the at least some flight course requirements may be received or retrieved by the flight school credentialing and verification software application from external software (e.g., software operated by the regulatory body). For example, the flight school credentialing and verification software application may have communication enabled between it and the external software. The flight school credentialing and verification software application may be configured to receive updates to flight course requirements from the external software and/or retrieve such updates from the external software, in either case the updating being done automatically and without requiring manual user intervention.

In some implementations, the technique 700 may include determining an expiration of a required certification for the user, determining that a rental agreement has been updated since the execution of the rental agreement by the user, or that other credential items have expired or are otherwise no longer valid. For example, where one of the credential definitions corresponds to a required certification, responsive to a determination of the expiration of the required certification, the technique 700 may include revoking an existing flight course registration for the user, in which the existing flight course registration corresponds to a flight course requirement related to the credential definition, and transmitting a notification to a client device of the user to indicate the revocation of the existing flight course registration.

In another example, where one of the credential definitions corresponds to a rental agreement executed between the user and a flight school operating the flight school credentialing and verification software application, the technique 700 may include requesting a re-execution of the updated rental agreement by the user within a defined time period. Responsive to a determination that the user has not re-executed the updated rental agreement within the defined time period, the technique 700 may include revoking an existing flight course registration for the user, in which the existing flight course registration corresponds to a flight course requirement related to the credential definition, and transmitting a notification to a client device of the user to indicate the revocation of the existing flight course registration.

Referring next to FIG. 8, the technique 800 for custom flight course creation intelligence using a flight school credentialing and verification system is shown. The technique 800 represents operations which may be performed by or using a custom flight course creation intelligence tool of a flight school credentialing and verification software application, for example, the custom flight course creation intelligence tool 500 shown in FIG. 5.

At 802, user information is received. The user information is indicative of credential items of a user of the flight school credentialing and verification software application. The user information is further indicative of a goal of the user relative to the flight school and a skillset of the user. The user information may be received from a client device of the user, a data store that stores the user information, input directly by the user into a computing device which implements the flight school credentialing and verification system, or the like.

At 804, a starting flight course is determined. The starting flight course is a flight course offering of the flight school which will serve as a starting point for the custom flight course creation for the user. The starting flight course is determined based on the user information. For example, the available credential items of the user and the particular goal or goals of the user may guide the selection of a particular flight course as the starting flight course. Customizations of the starting flight course are also determined based on the skillset of the user. For example, where the user is largely unskilled, a customization may include supplementing the starting flight course using flight simulator sessions. In another example, where the user is skilled in instrument proficiency, such as indicated by a credential item of the user being a valid instrument proficiency check certificate, a session of the flight course typically dedicated to instrument proficiency may be removed.

At 806, a determination is made as to whether the credential items of the user related to the starting flight course satisfy one of more credential definitions. This determination may be performed in the same way as to similar to the determination performed at 704 of the technique 700 shown in FIG. 7. The determination may contemplate credential definitions for both of the starting flight course and customizations thereto already identified.

At 808, responsive to a determination that the credential items satisfy the one or more credential definitions, an availability of one or more resources of the flight school is verified. This verification may be performed in the same was as or similar to the verification performed at 706 of the technique 700. The verification may contemplate resources for both of the starting flight course and customizations thereto already identified.

At 810, flight course output indicative of the customized flight course is generated. The flight course output represents a registration of a user of the custom flight course. In some implementations, multiple candidate custom flight courses may be determined, for example, in which each corresponds to a different date and/or time. In some such implementations, the candidate custom flight courses may be output to a display of a computing device for selection by the user.

Referring finally to FIG. 9, the technique 900 for third party software integration using a flight school credentialing and verification system is shown. The technique 900 represents operations which may be performed by or using a third party software integration tool of a flight school credentialing and verification software application, for example, the third party software integration tool 600 shown in FIG. 6.

At 902, user information and course information are received. The user information is indicative of credential items of a user of the flight school credentialing and verification software application. The course information is indicative of a flight course for which the user seeks registration. The user information and the course information may be received from a client device of the user, a data store that stores the user information and the course information, input directly by the user into a computing device which implements the flight school credentialing and verification system, or the like.

At 904, a flight course registration of the user is determined. Determining a flight course registration of the user includes searching records of the flight school to identify a flight course with which the user is registered. The search may be performed using the course information received alongside the user information.

At 906, a user status of the user is determined. The user status may refer to one or more aspects, for example, based on the context of the third party integration used. In some implementations, the user status may refer to a progress of the user through a flight education class or flight education homework. In some implementations, the user status may refer to a progress of the user through the flight course with which the user is registered.

At 908, the user information of the user is tagged according to the determined user status of the user. The tag is metadata or other information which configures third party software to process the user information, such as to identify the user status of the user. The particular aspect tagged may, for example, be based on the context of the third party integration used. In some implementations, an indication of a product or service of potential value to the user may be tagged to indicate that product or service to the third party software. In some implementations, an indication of the current progress of the user through some or all of the subject flight course may be tagged to indicate a flight-related skillset, knowledge, or area of focus of the user to the third party software.

At 910, status indication output is generated to indicate the tagged user information to the third party software. The status indication output may be transmitted to the third party software from the flight school credentialing and verification system.

Figure 10:
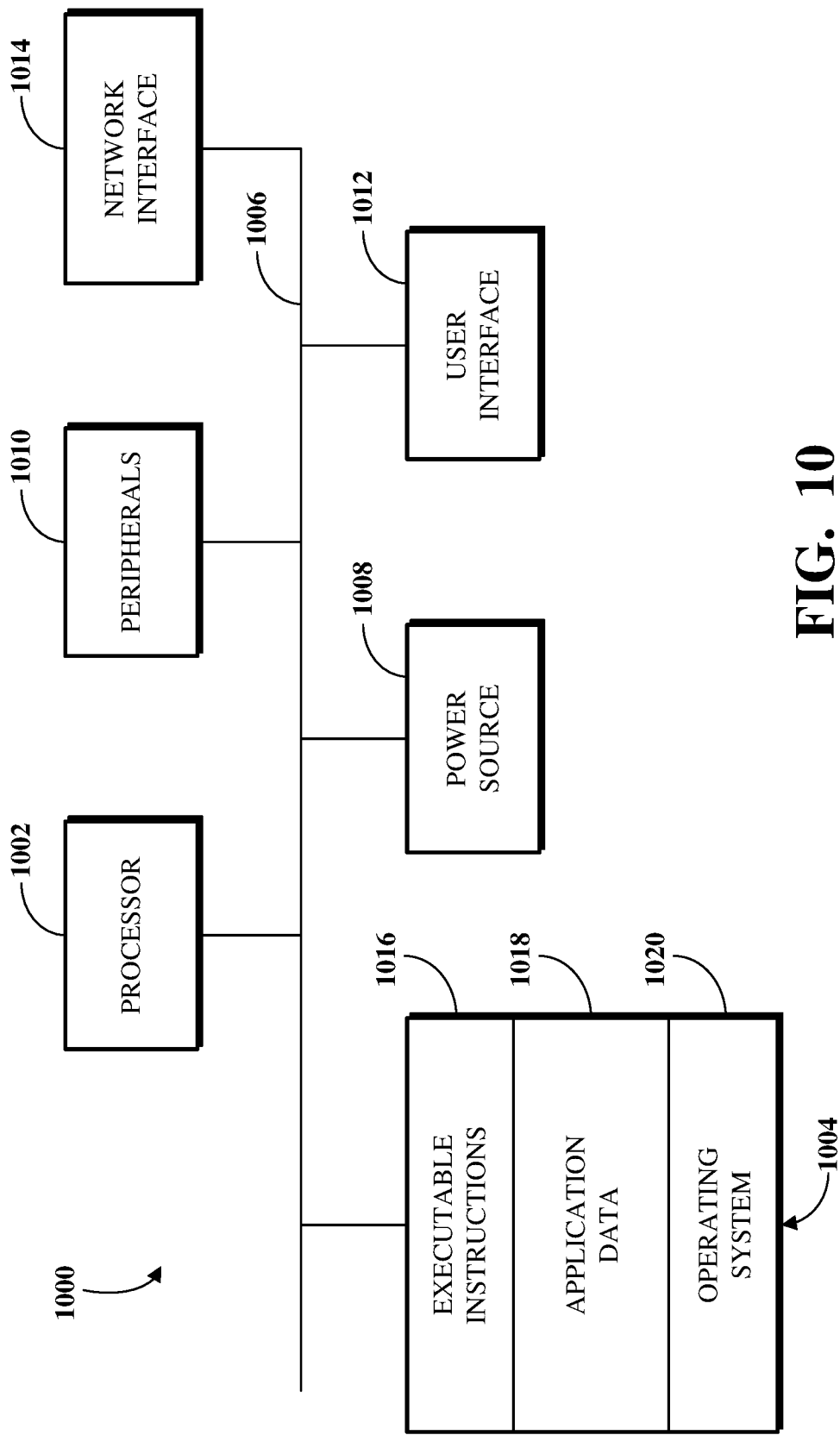
FIG. 10 is a block diagram showing an example of a computing device which may be used in a flight school credentialing and verification system.

FIG. 10 is a block diagram showing an example of a computing device 1000 which may be used in a flight school credentialing and verification system, for example, the flight school credentialing and verification system 100 shown in FIG. 1. The computing device 1000 may be used to implement a software application (e.g., the flight school credentialing and verification software 200 shown in FIG. 2, for example, where the computing device 1000 is the server device 102 shown in FIG. 1 or another computing device). Alternatively, the computing device 1000 may be used to implement a client that accesses the software application (e.g., the client device 108 shown in FIG. 1). As a further alternative, the computing device 1000 may be used as or to implement another client, server, or other device according to the implementations disclosed herein.

The computing device 1000 includes components or units, such as a processor 1002, a memory 1004, a bus 1006, a power source 1008, peripherals 1010, a user interface 1012, and a network interface 1014. One of more of the memory 1004, the power source 1008, the peripherals 1010, the user interface 1012, or the network interface 1014 can communicate with the processor 1002 via the bus 1006.

The processor 1002 is a central processing unit, such as a microprocessor, and can include single or multiple processors having single or multiple processing cores. Alternatively, the processor 1002 can include another type of device, or multiple devices, now existing or hereafter developed, configured for manipulating or processing information. For example, the processor 1002 can include multiple processors interconnected in any manner, including hardwired or networked, including wirelessly networked. For example, the operations of the processor 1002 can be distributed across multiple devices or units that can be coupled directly or across a local area or other suitable type of network. The processor 1002 can include a cache, or cache memory, for local storage of operating data or instructions.

The memory 1004 includes one or more memory components, which may each be volatile memory or non-volatile memory. For example, the volatile memory of the memory 1004 can be random access memory (RAM) (e.g., a DRAM module, such as DDR SDRAM) or another form of volatile memory. In another example, the non-volatile memory of the memory 1004 can be a disk drive, a solid state drive, flash memory, phase-change memory, or another form of non-volatile memory configured for persistent electronic information storage. The memory 1004 may also include other types of devices, now existing or hereafter developed, configured for storing data or instructions for processing by the processor 1002. In some implementations, the memory 1004 can be distributed across multiple devices. For example, the memory 1004 can include network-based memory or memory in multiple clients or servers performing the operations of those multiple devices.

The memory 1004 can include data for immediate access by the processor 1002. For example, the memory 1004 can include executable instructions 1016, application data 1018, and an operating system 1020. The executable instructions 1016 can include one or more application programs, which can be loaded or copied, in whole or in part, from non-volatile memory to volatile memory to be executed by the processor 1002. For example, the executable instructions 1016 can include instructions for performing some or all of the techniques of this disclosure. The application data 1018 can include user data, database data (e.g., database catalogs or dictionaries), or the like. In some implementations, the application data 1018 can include functional programs, such as a web browser, a web server, a database server, another program, or a combination thereof. The operating system 1020 can be, for example, Microsoft Windows®, Mac OS X®, or Linux®, an operating system for a small device, such as a smartphone or tablet device; or an operating system for a large device, such as a mainframe computer.

The power source 1008 includes a source for providing power to the computing device 1000. For example, the power source 1008 can be an interface to an external power distribution system. In another example, the power source 1008 can be a battery, such as where the computing device 1000 is a mobile device or is otherwise configured to operate independently of an external power distribution system.

The peripherals 1010 includes one or more sensors, detectors, or other devices configured for monitoring the computing device 1000 or the environment around the computing device 1000. For example, the peripherals 1010 can include a geolocation component, such as a global positioning system location unit. In another example, the peripherals can include a temperature sensor for measuring temperatures of components of the computing device 1000, such as the processor 1002. In some implementations, the computing device 1000 can omit the peripherals 1010.

The user interface 1012 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 1014 provides a connection or link to a network (e.g., the network 110 shown in FIG. 1). The network interface 1014 can be a wired network interface or a wireless network interface. The computing device 1000 can communicate with other devices via the network interface 1014 using one or more network protocols, such as using Ethernet, TCP, IP, power line communication, Wi-Fi, Bluetooth, infrared, GPRS, GSM, CDMA, Z-Wave, ZigBee, another protocol, or a combination thereof.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc.

Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A flight school credentialing and verification system, comprising:
    a server device including a storage device, one or more memories, and one or more processors, wherein the storage device includes a data store storing resource information indicative of resources of a flight school and credential definitions indicative of flight course requirements defined by a regulatory body, and wherein the one or more memories are configured to store instructions for a flight school credentialing and verification software application executable within a first software environment; and
    an aircraft including an onboard computer configured to automatically transmit, to the server device, aircraft information indicative of a condition of the aircraft,
    wherein the one or more processors are configured to execute the instructions within the first software environment to:
        receive, via a graphical user interface rendered within a web browser application running at a client device of a user of the flight school credentialing and verification software application, user information indicative of credential items of the user and course information indicative of a flight course for which the user seeks registration;
        determine whether the credential items of the user related to the flight course satisfy one of more of the credential definitions, wherein the one or more credential definitions are defined for the flight course;
        responsive to a determination that the credential items satisfy the one or more credential definitions, verify an availability of one or more of the resources using the resource information, wherein the one or more resources are used for the flight course and include the aircraft;
        responsive to a verification of the availability of the resources, determine one or more candidate flight course registrations, wherein each of the candidate flight course registrations corresponds to a different date or time;
        generate flight course output indicative of a selected flight course registration of the one or more candidate flight course registrations;
        obtain, from external software of the regulatory body running within a second software environment external to the first software environment at a time after the flight course output is generated, data indicative of changes made by the regulatory body to at least some of the flight course requirements as output from a computer-executed function call from an application programming interface configured for use with the external software;
        automatically update at least some of the credential definitions according to the data obtained from the external software by updating records of instances of one or more customer users of the flight school credentialing and verification software application within the data store;
        automatically determine, using the at least one of the updated records within the data store, whether the updated at least some credential definitions are satisfied by credential items of the user;
        responsive to a determination that the updated at least some credential definitions are satisfied by the credential items of the user, maintain the flight course registration;
        responsive to a determination that the at least some credential definitions updated according to the changes to the at least some flight course requirements are not satisfied by the credential items of the user:
            revoke the flight course registration; and
            transmit a notification to a client device of the user to indicate the revocation of the flight course registration;
        obtain, from the onboard computer of the aircraft via wireless communication, the aircraft information;
        determine, automatically in response to obtaining the aircraft information, to reschedule, according to the condition of the aircraft, the flight course registration and one or more other flight course registrations associated with the aircraft; and
        transmit, to the client device of the user and to one or more other client devices of one or more users associated with the one or more other flight course registrations and for output within one or more graphical user interfaces rendered at the client device and the one or more other client devices, notifications to indicate the rescheduling.

2. The flight school credentialing and verification system of claim 1, further comprising:
    a network interface that enables communication of data with the external software, wherein the data indicative of the changes made by the regulatory body to the at least some flight course requirements is received or retrieved by the flight school credentialing and verification software application from the external software.

3. The flight school credentialing and verification system of claim 1, wherein the flight course output corresponds to a series of multiple sessions for the selected flight course registration.

4. The flight school credentialing and verification system of claim 1, wherein the instructions include instructions to:
    integrate functionality of learning management software operated by a third party within the flight school credentialing and verification software application, wherein the integrated functionality corresponds to visibility of coursework and analytics data of the learning management software; and transmit a status indication of the user to the learning management software, wherein the status indication corresponds to a partial or full completion of a flight course.

5. The flight school credentialing and verification system of claim 1, wherein the flight school credentialing and verification software application is implemented as a platform-as-a-service software product or a software-as-a-service software product, and wherein customers of the platform-as-a-service software product or the software-as-a-service software product are flight schools.

6. A flight school credentialing and verification system, comprising:
a storage device that includes a data store storing resource information indicative of resources of a flight school and credential definitions indicative of flight course requirements defined by a regulatory body;
one or more memories that store instructions for a flight school credentialing and verification software application executable within a first software environment; and
one or more processors that execute the instructions within the first software environment to:
receive, via a graphical user interface rendered within a web browser application running at a client device of a user of the flight school credentialing and verification software application, user information indicative of credential items of the user and course information indicative of a flight course for which the user seeks registration;
determine whether the credential items of the user related to the flight course satisfy one of more of the credential definitions, wherein the one or more credential definitions are defined for the flight course;
responsive to a determination that the credential items satisfy the one or more credential definitions, verify an availability of one or more of the resources using the resource information, wherein the one or more resources are used for the flight course and include an aircraft;
responsive to a verification of the availability of the resources, determine one or more candidate flight course registrations, wherein each of the candidate flight course registrations corresponds to a different date or time;
generate flight course output indicative of a selected flight course registration of the one or more candidate flight course registrations;
obtain, from external software of the regulatory body running within a second software environment external to the first software environment at a time after the flight course output is generated, data indicative of changes made by the regulatory body to at least some of the flight course requirements as output from a computer-executed function call from an application programming interface configured for use with the external software;
automatically update at least some of the credential definitions according to the data obtained from the external software by updating records of instances of one or more customer users of the flight school credentialing and verification software application within the data store;
automatically determine, using the at least one of the updated records within the data store, whether the updated at least some credential definitions are satisfied by credential items of the user;
maintain or revoke the flight course registration based on the automated determination;
obtain, from an onboard computer of the aircraft via wireless communication, aircraft information indicative of a condition of the aircraft;
determine, automatically in response to obtaining the aircraft information and based on a maintenance of the flight course registration, to reschedule, according to the condition of the aircraft, the flight course registration and one or more other flight course registrations associated with the aircraft; and
transmit, to the client device of the user and to one or more other client devices of one or more users associated with the one or more other flight course registrations and for output within one or more graphical user interfaces rendered at the client device and the one or more other client devices, notifications to indicate the rescheduling.

7. The flight school credentialing and verification system of claim 6, wherein the data indicative of the changes made by the regulatory body to at least some of the flight course requirements is obtained by the external software pushing the data to the flight school credentialing and verification software application using the function call or by the flight school credentialing and verification software application pulling the data from the external software using the function call.

8. The flight school credentialing and verification system of claim 6, wherein the instructions to maintain or revoke the flight course registration based on the automated determination include instructions to:
responsive to a determination that the updated at least some credential definitions are satisfied by the credential items of the user, maintain the existing flight course registration.

9. The flight school credentialing and verification system of claim 6, wherein the instructions to maintain or revoke the flight course registration based on the automated determination include instructions to:
responsive to a determination that the updated at least some credential definitions are not satisfied by the credential items of the user, revoke the existing flight course registration; and
transmit a notification to a client device of the user to indicate the revocation of the existing flight course registration.

10. The flight school credentialing and verification system of claim 7, further comprising:
a network interface that enables communication of data with the external software.

11. The flight school credentialing and verification system of claim 6, wherein one of the credential definitions corresponds to a required certification, wherein the instructions include instructions to:
determine, based on an expiration date of the required certification for the user, an expiration of the required certification for the user;
responsive to the determination of the expiration of the required certification:
revoke an existing flight course registration for the user, wherein the existing flight course registration corresponds to a flight course requirement related to the credential definition; and
transmit a notification to a client device of the user to indicate the revocation of the existing flight course registration.

12. The flight school credentialing and verification system of claim 6, wherein one of the credential definitions corresponds to a rental agreement executed between the user and a flight school operating the flight school credentialing and verification software application, wherein the instructions include instructions to:
  determine, based on an execution date of the rental agreement, that the rental agreement has been updated since the execution of the rental agreement by the user;
  request re-execution of the updated rental agreement by the user within a defined time period;
  responsive to a determination that the user has not re-executed the updated rental agreement within the defined time period:
    revoke an existing flight course registration for the user, wherein the existing flight course registration corresponds to a flight course requirement related to the credential definition; and
    transmit a notification to a client device of the user to indicate the revocation of the existing flight course registration.

13. The flight school credentialing and verification system of claim 6, wherein the instructions include instructions to:
  integrate functionality of learning management software operated by a third party within the flight school credentialing and verification software application, wherein the integrated functionality corresponds to visibility of coursework and analytics data of the learning management software.

14. The flight school credentialing and verification system of claim 13, wherein the instructions include instructions to:
  transmit a status indication of the user to the learning management software, wherein the status indication corresponds to a partial or full completion of a flight course.

15. The flight school credentialing and verification system of claim 6, wherein the flight course output corresponds to a series of multiple sessions for the selected flight course registration.

16. A flight school credentialing and verification system, comprising:
  one or more memories that store instructions for a flight school credentialing and verification software application executable within a first software environment; and
  one or more processors that execute the instructions within the first software environment to:
    determine whether credential items of a user of the flight school credentialing and verification software application satisfy one of more credential definitions defined for a flight course;
    responsive to a determination that the credential items satisfy the one or more credential definitions, verify an availability of one or more resources of a flight school used for the flight course, wherein the one or more resources include an aircraft;
    responsive to a verification of the availability of the resources, determine one or more candidate flight course registrations;
    generate flight course output indicative of a selected flight course registration of the one or more candidate flight course registrations;
    obtain, from external software of a regulatory body defining the flight course requirements, the external software running within a second software environment external to the first software environment at a time after the flight course output is generated, data indicative of changes made by the regulatory body to at least some of the flight course requirements as output from a computer-executed function call from an application programming interface configured for use with the external software;
    automatically update at least some of the credential definitions according to the data obtained from the external software by updating records of instances of one or more customer users of the flight school credentialing and verification software application within the data store;
    automatically determine, using the at least one of the updated records within the data store, whether the updated at least some credential definitions are satisfied by credential items of the user;
    maintain or revoke the flight course registration based on the automated determination;
    obtain, from an onboard computer of the aircraft via wireless communication, aircraft information indicative of a condition of the aircraft;
    determine, automatically in response to obtaining the aircraft information and based on a maintenance of the flight course registration, to reschedule, according to the condition of the aircraft, the flight course registration and one or more other flight course registrations associated with the aircraft; and
    transmit, to a client device of the user and to one or more other client devices of one or more users associated with the one or more other flight course registrations, notifications to indicate the rescheduling.

17. The flight school credentialing and verification system of claim 16, wherein the flight course output corresponds to a series of multiple sessions for the selected flight course registration.

18. The flight school credentialing and verification system of claim 16, wherein the instructions include instructions to:
  customize the flight course according to one or both of a goal of the user relative to the flight school or a skill set of the user.

19. The flight school credentialing and verification system of claim 18, wherein the instructions to customize the flight course according to the one or both of the goal of the user relative to the flight school or the skill set of the user include instructions to:
  add lessons to or remove lessons from the flight course, wherein added lessons differ in scope from existing lessons of the flight course.

20. The flight school credentialing and verification system of claim 16, wherein the resources of the flight school correspond to one or more of aircraft, flight equipment other than aircraft, trainers, flight simulation equipment, classrooms, digital or physical school materials, aircraft fuel, or products or services made available to the flight school through a third party.

* * * * *